United States Patent
Jerrel

[11] 3,891,177
[45] June 24, 1975

[54] SUPPORT MEANS FOR WHEELED VEHICLES

[76] Inventor: Raymond M. Jerrel, 300 N. Strevell Ave., Miles City, Mont. 59301

[22] Filed: Apr. 23, 1973

[21] Appl. No.: 353,346

[52] U.S. Cl. ............................... 248/352; 248/13
[51] Int. Cl.² ................................. F16M 11/00; F16M 13/00; E04G 25/00
[58] Field of Search............ 248/352, 119 R, 12, 13, 248/174; 280/35, 47.15, 150 A; 254/86 R

[56] References Cited
UNITED STATES PATENTS

| | | | |
|---|---|---|---|
| 1,079,020 | 11/1913 | Perrine | 248/119 R X |
| 1,398,086 | 11/1921 | Cooney | 248/119 R |
| 1,617,400 | 2/1927 | Lanning | 248/119 R |
| 1,754,803 | 4/1930 | Rogers | 248/119 R |
| 2,422,414 | 6/1947 | Stevens | 90/18 |
| 2,462,418 | 2/1949 | Peglow | 254/133 |
| 2,493,295 | 1/1950 | Kron | 248/352 |
| 2,684,222 | 7/1954 | Miller | 248/49 |
| 3,770,323 | 11/1973 | Isaacson | 254/86 R X |
| D60,044 | 12/1921 | Kopf | D12/55 |
| D114,068 | 4/1939 | Howell | D12/55 |
| D122,574 | 9/1940 | Mizer | D12/60 |
| D215,746 | 10/1969 | Hunnicutt et al. | D12/217 |

*Primary Examiner*—J. Franklin Foss

[57] ABSTRACT

The disclosed supporting means is designed to serve a function similar to a jack stand for automobiles or trucks. The upper portion of the support means is provided with a slot-like opening and/or circular holes to facilitate fastening the support to an exposed hub of the motor vehicle by a secure threaded or frictional engagement. In operation, the vehicle is jacked up and a wheel is removed. The support means of the invention is then secured to the hub with threaded members conventionally provided for the hub/wheel combination. The vehicle can then be lowered and the jack removed. A three-sided upright portion integral with a flat base enables the support means to be an unusually firm stand upon which even heavy trucks can safely rest.

6 Claims, 7 Drawing Figures

PATENTED JUN 24 1975　　　　3,891,177

SHEET　　1

SUPPORT MEANS FOR WHEELED VEHICLES

FIELD OF THE INVENTION

This invention relates to a load-supporting stand or support means particularly adapted for secure attachment to the exposed hub of a wheeled vehicle with one or more frictionally engaged or threaded members. An aspect of this invention relates to the combination of a wheeled vehicle with at least one wheel removed and a supporting means for maintaining the vehicle in a generally raised attitude with respect to the surface on which the vehicle rests. An aspect of this invention relates to a support means or stand for providing a portion of a wheeled vehicle with a safe base and for permitting and facilitating repairing or servicing of the motor vehicle, particularly on the underside of the vehicle.

DESCRIPTION OF THE PRIOR ART

A typical procedure for doing work under cars, trucks, and other motor vehicles is to raise the vehicle with a device such as a lift or jack. These devices can also be used to facilitate the changing of wheels and tires. Large lifts driven by hydraulic fluids or compressed air are often used for smaller motor vehicles, such as automobiles, but can be inconvenient to use or inadequate for trucks. The normal procedure for doing work under trucks is to simply jack them up. Jacks typically used for this purpose can get in the way of repair work. To alleviate this problem, the jack is sometimes removed and the vehicle allowed to rest on jack stands or blocks. However, conventional jacks and jack stands do not always provide a firm base for the truck. For example, a slight shifting of the load on the jack can cause it to slip, posing the danger that the truck may fall off the jack. To minimize the risk of slippage, various designs for jack stands and jack heads have been proposed. Devices adapted for attachment to the motor vehicle which provide firmer engagement of the jack head have also been suggested. For example, for tire-changing operations, various jack accessories or abutment devices have been designed to provide a readily accessible flat surface or other configuration to abut or engage the head or top of the jack.

Nevertheless, there still exists a need for a relatively simple support means or stand which will provide firm support with unhindered access to the underside of a truck. This invention contemplates the fulfillment of this need.

The patent literature regarding jacks, stands, and other support devices is fairly extensive. The following references are believed to be illustrative:

U.S. Pat. No. 2,422,414 (Stevens), June, 1947;
U.S. Pat. No. 2,462,418 (Peglow), February, 1949;
U.S. Pat. No. 2,684,222 (Miller), July, 1954;
and the following U.S. Design Patents:
Des. 60,044 (Kopf), December, 1921;
Des. 114,068 (Howell), April, 1939;
Des. 122,574 (Mizer), September, 1940; and
Des. 215,746 (Hunnicutt et al), October, 1969.

SUMMARY OF THE INVENTION

To provide a safe, secure base for a truck or other motor vehicle while the underside of the vehicle is being serviced (or tires changes, etc.), the present invention contemplates jacking up the vehicle, removing a wheel, and using the bolts, lugs, nuts, or studs, conventionally provided for threaded or frictional engagement with corresponding male or female members on the hub assembly, to secure a support means of this invention to the vehicle. The vehicle can then be lowered onto a firm stand or support provided by the support means, which comprises a generally upright support member and a generally horizontally extending base. The upper end of the support member is provided with an aperture means, e.g. a slot or a hole, preferably a plurality of circular holes, to permit the studs, bolts, lugs, or similar elongated fastening members having a circular cross-section to pass through this end of the support and secure the support to the hub assembly. A feature of this upper end of the support is that it is designed to minimize movement or slippage of any sort due to, for example, shifting of the load on the support. One means for preventing slippage is to provide the upper portion of the support with a configuration (e.g. a curved flange) which snugly abuts a protruding portion of the hub assembly. Preferably, it is this upper flange portion of the support which is provided with the circular holes for the lugs, bolts, or studs and/or a curved slot having the same radius as the radial arrangement of bolts studs, etc. projecting from or engaging the hub assembly. The curved slot embodiment is intended for universal attachment to a variety of circumferential spacing of bolts, studs, etc. If the support means is to be manufactured for a particular type of standard hub assembly, the use of the circular holes is simpler and more effective. A single circular hole is adequate if the upper flange forms a sufficiently snug abutting relationship to a ridge or the like on the hub assembly. More preferably, a plurality (e.g. at least three) of circular holes in the curved flange portion is provided for secure fastening and maximum stability. In any event, it is preferred that the curved or arcuate flange portion subtend a substantial arc on the automobile or truck hub assembly. A typical substantial arc would be at least 45°, preferably 90° or more.

The support means comprises a generally flat base from which an upright support member extends to the periphery of the exposed hub of the vehicle; preferably, the upright support member has three-sided structure with a middle section and two side flanges or panels extending from the side edges of the middle section. The aforementioned upper flange portion typically extends along the hub periphery and upward far enough toward the center of the hub to allow for matching of the slot or the bolt (or stud or lug) with corresponding studs or holes in the hub assembly. The inboard face of the flange portion (or the inboard face of the upper end of the upright support member) is thus secured in face-to-face relationship to the outboard face of the hub assembly.

DETAILED DESCRIPTION OF THE DRAWING

Figure 1:
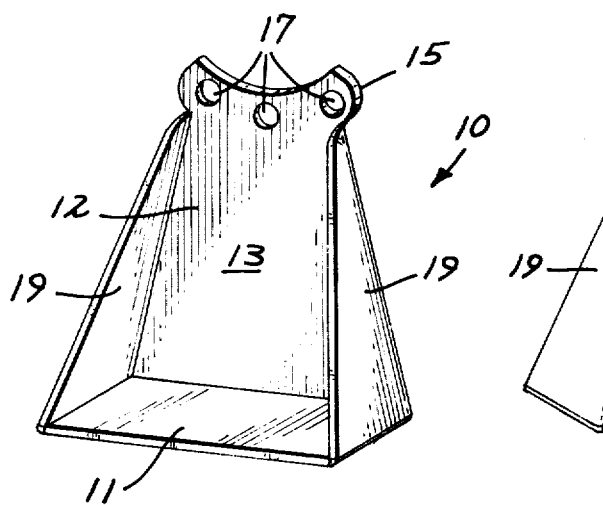
FIG. 1 is a perspective view of a support means of this invention as seen from a position generally opposite the front or outboard face of the upright portion thereof.

In the following description of the drawing, it should be noted that like reference numerals indicate like parts throughout the various FIGURES of the drawing.

Figure 2:
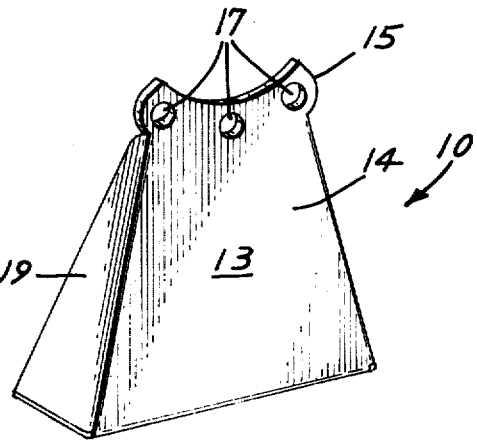
FIG. 2 is a perspective view of a support means of this invention as seen from a position generally opposite the rear or inboard face of the upright portion thereof.

Reference numeral 10 generally denotes a support means or stand of this invention, which comprises a generally horizontally extending flat base 11, a generally upright, plate-like support member 13 provided with an arcuate flange portion 15 having circular bolt or lug or stud holes 17 therein, and triangular-shaped side panels or braces or flanges 19, which provide additional support and strength for support means 10. As will be readily apparent from a comparison of FIGS. 1 and 2, the generally upright, plate-like support member 13, which forms a part of a three-sided vertical support comprising this member 13 and the flanges 19, has a face 12 generally intended to be outboard with respect to the vehicle and a face 14 intended to face inboard.

Figure 3:
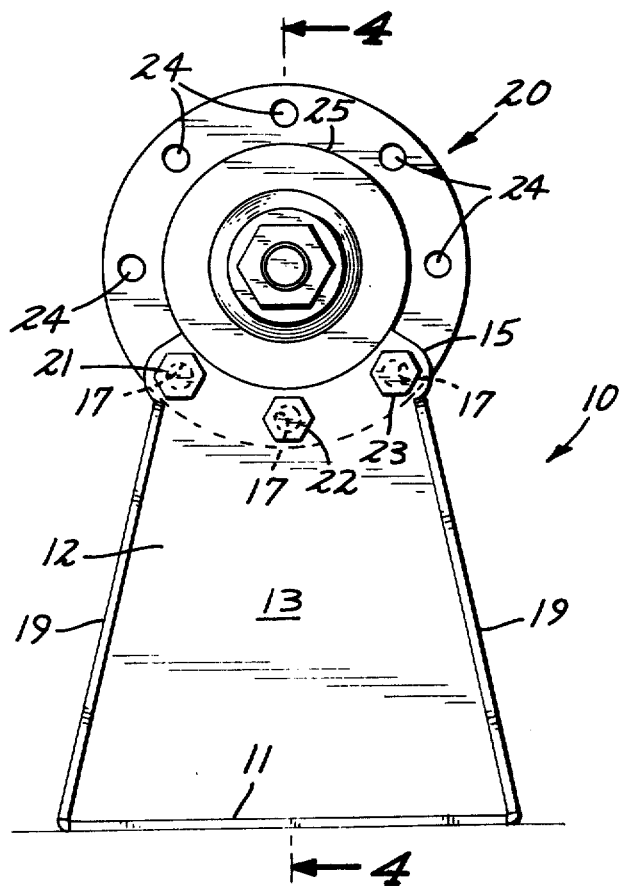
FIG. 3 is a front elevational view of a support means of this invention combined with the conventional hub assembly of a truck.
Figure 4:
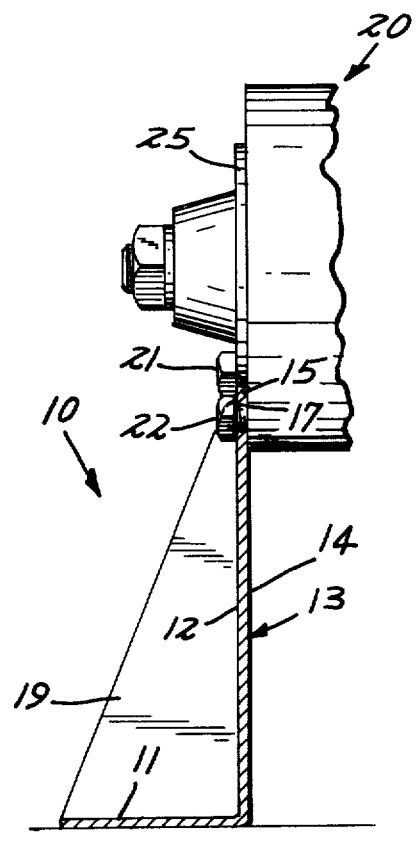
FIG. 4 is a cross-sectional view taken generally along line 4—4 of FIG. 3.

The proper position of support means 10 in actual use (i.e., in combination with a motor vehicle) is illustrated in FIGS. 3 and 4. Reference numeral 20 denotes a conventional hub assembly for a large truck (which could be a tractor or semi for a tractor-trailer), e.g. weighing more than 3 tons. Hub assembly 20 can house brake shoes or the like and also provide the hub on which the wheel is mounted using bolts or lugs (e.g. similar to lugs 21, 22, and 23) which thread into or frictionally engage female fittings or members 24 in hub assembly 20. Alternatively, of course, hub assembly 20 can be provided with projecting studs, threaded for engagement with wheel nuts. The conventional truck hub assembly 20 illustrated in FIG. 3 has eight openings or threaded female members 24 for receiving eight lugs, all but three of which have been removed. The remaining three lugs 21, 22, and 23 have been used to secure flange portion 15 to the hub assembly 20.

In various modifications of the support means of this invention, more or fewer holes 17 can be used. For example, in one embodiment (not shown in the Drawing) holes 17 are eliminated altogether and replaced by a curved slot concentric with the curved shape of arcuate flange 15. Typically, the slot would extend through the arc subtended by the three holes 17 and would have generally the same radius as the arc along which holes 17 are arranged. Although the slot embodiment is not as secure and as resistant to slippage as the embodiment shown in FIGS. 1–4 of the Drawing, it has the advantage of being able to accommodate various circumferential spacings of lugs, bolts, or studs on various types of conventional hub assemblies.

AS will be apparent to those skilled in the art, it is readily possible to provide more than three lug or bolt or stud holes 17 by extending arcuate portion 15 through a greater number of degrees of arc. For most applications of this invention, flange 15 should subtend at least 45° of arc, preferably 90° or more. By extending flange 15 to an arc of slightly more than 180°, five holes 17 could be provided to accommodate five bolts of the hub assembly 20 shown in FIG. 3. Similarly, by narrowing the arc to 45°, only a single hole 17 would be provided. This embodiment would be less secure, but would have advantages similar to the slot embodiment described previously. (As a further alternative to the slot embodiment or the single hole embodiment, additional holes with varying spacing can also be provided; various combinations of circular holes and slots can also be used.)

The arcuate shape of the upper edge of flange 15 is particularly useful when the hub assembly 20 has a projecting circular ridge 25, as in FIG. 3. The snug vertical abutting relationship between the upper edge of flange 15 and ridge 25 provides additional protection against slippage of support means 10.

Various methods for fabricating support means 10 will occur to those skilled in the art. A single, integral, forged or die-cast piece of metal can provide all the essential structural elements of a support means of this invention including base 11, upright support portion 13, flanges 19, and flange 15. Alternatively, the flanges 19 and/or flange 15 can be fabricated or shaped in separate operations and welded to the base 11 and upright support 13. So long as the resulting support means 10 is a strong, integral structure, it can be fabricated from as many pieces of separate metal as would be convenient in either a low-volume or high-volume production situation.

Although a support means of this invention can be used to facilitate tire-changing and wheel-mounting operations, both for automobiles and trucks, the typical field of application of this invention is in the servicing of the underside of a truck. For this application, the dimensions of the upright support 13 can be tailor made for various types of trucks, or, preferably, can provide enough height to raise virtually any conventional truck into a position which will facilitate servicing. In operation, the conventional jack is used to raise the truck until the wheels and tires are off the ground or service floor, and one or more wheels are removed. The support means is then placed so that the studs (or lugs, bolts, nuts, etc.) can be threaded or frictionally engaged and the support means secured firmly to the hub assembly. The truck can then be lowered slightly until base 11 contacts the floor or the ground, and the jack can be removed. This procedure permits the use of a support means with the high degree of simplicity of structures shown in FIGS. 1–7. It is, however, within the scope of this invention to utilize height adjusting means (e.g. integral or built-in hydraulic jacks or mechanical jack screws) to impart a height-adjusting capability to the support means itself.

Figure 5:
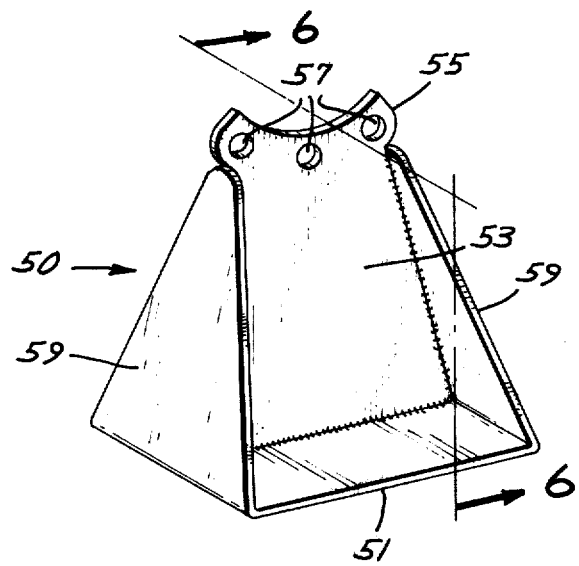
FIG. 5 is a perspective view of a modified form of a support means of this invention.
Figure 7:
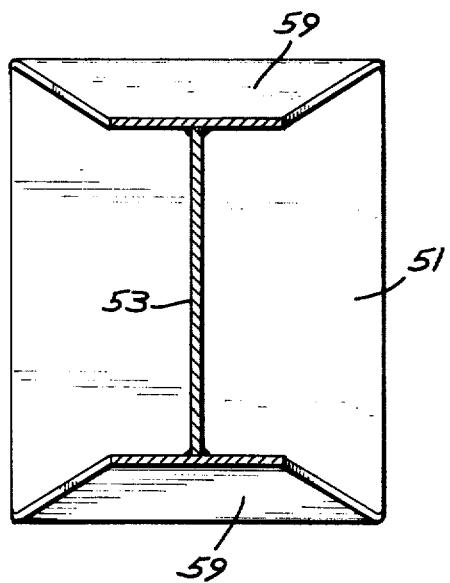
FIG. 7 is a further cross-sectional view taken along line 7—7 of FIG. 6.
Figure 6:
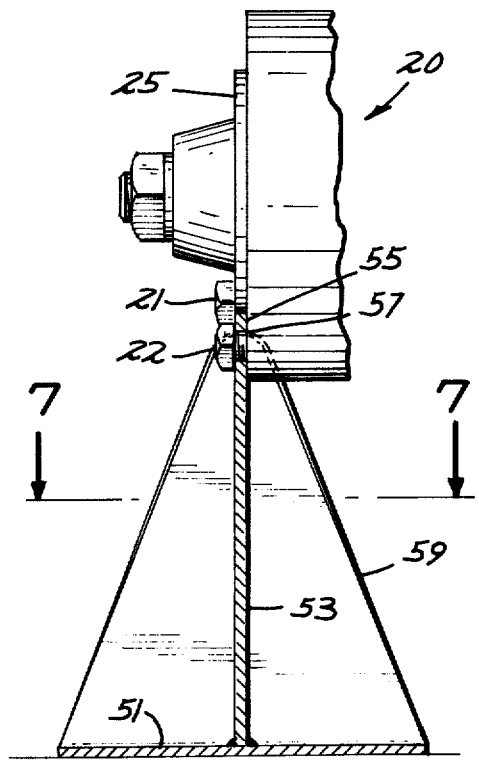
FIG. 6 is a cross-sectional view taken generally along line 6—6 of FIG. 5.

Everything that has been said regarding support means 10 of FIGS. 1–4 is generally applicable to the modified form of this support means shown in FIGS. 5–7. Support means 50 of FIGS. 5–7 also has a base 51, upright support member 53, side braces or flanges 59, and arcuate flange portion 55 provided with circular holes 57. An advantage of support means 50 is that its broader symmetrical base 51 and brace 59 arrangement provides even greater security against slipping due to shifting of the load supported by the upright support member 53.

What is claimed is:

1. In the combination of a truck weighing more than three tons having at least one wheel removed, an exposed wheel hub assembly where a said wheel has been removed, at least three circular cross-section elongated fastening means for fastening the wheel to the exposed hub assembly, and a supporting means for maintaining the truck in a generally raised attitude with respect to the surface on which the truck rests, a support means which comprises:

a generally flat, horizontally extending base portion resting on the surface on which the truck rests, an elongated multi-sided upright support member, integral with said base portion, extending upward from said base portion up to about the lower periphery of an exposed hub assembly of the truck, said multi-sided support member comprising a generally trapezoidal middle portion and two generally triangular side panels integral with and extending from the side edges of said middle portion, and an arcuate upper flange portion for fastening of said multi-sided upright support member to said exposed hub assembly, said upper flange portion having an arcuate arrangement of three circular holes therein, circumferentially equally spaced along an arc concentric with the center of the exposed hub, said circular cross-section elongated fastening means being inserted through said circular holes, thereby securing said support means to said exposed wheel hub assembly.

2. A unitary support means adapted for attachment to a motor vehicle hub assembly which has wheel attachment bolts extending outwardly, to position the hub assembly above a support surface, comprising:

a. a generally flat base plate having a broad bottom surface for abuttably resting upon the support surface;

b. a plate-like unitary support web oriented generally perpendicular to said base plate, said support web having opposed sides, an upper portion and a base edge, said base edge intergrally attached to said base plate, said upper portion containing an arcuate indentation for receiving at least a portion of the hub assembly therein and aperature means for receiving the wheel attachment bolts therein to secure said support web to the hub assembly; and c. two triangularly shaped support flanges, each of said flanges generally perpendicular and integrally attached to the side edges of said support web and integrally attached to said base plate to form a box-shaped structure to resist compressive and tipping forces from the motor vehicle.

3. A combination comprising the unitary support means of claim 2 secured to the hub assembly of a motor vehicle.

4. The unitary support means of claim 2 wherein said support web has a trapezoidal planform with said sides each angling upwardly and inwardly toward the center of said web top portion to provide stability and to distribute the compressive vehicle load over a larger area.

5. The unitary support means of claim 4 wherein said triangularly shaped support flanges are each right triangles having perpendicular side and base edges, said side edge attached to said web side edge and said base edge attached to said base plate to leave one side of said support web unobstructed to allow easy access to the hub assembly.

6. The unitary support means of claim 2 wherein said base plate, said support web and said support flanges are integrally welded together.

* * * * *